June 5, 1951    W. T. DUNN    2,555,961
TRANSMISSION SYNCHROMESH MECHANISM
Filed Nov. 27, 1946    4 Sheets-Sheet 1
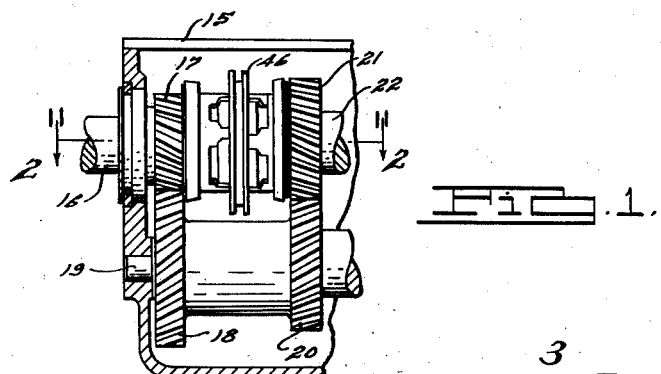
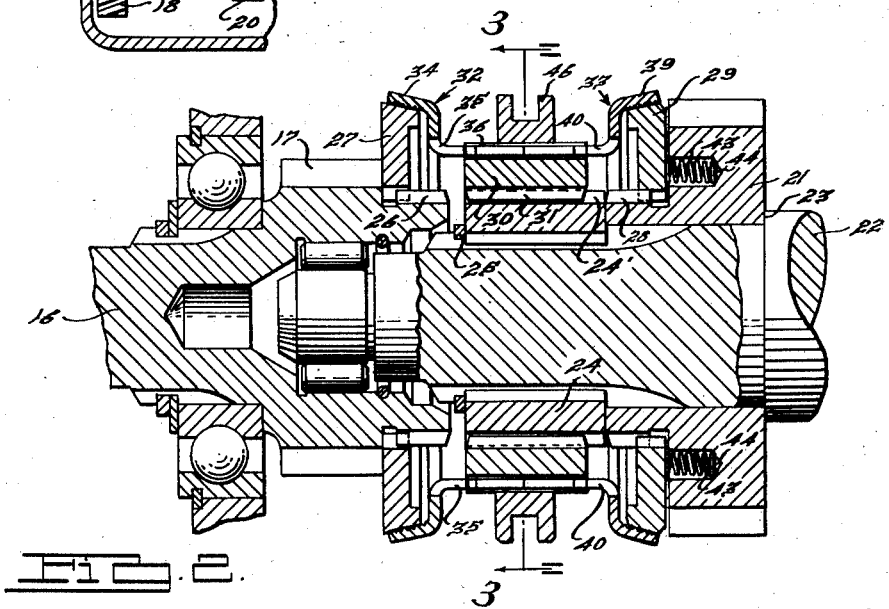
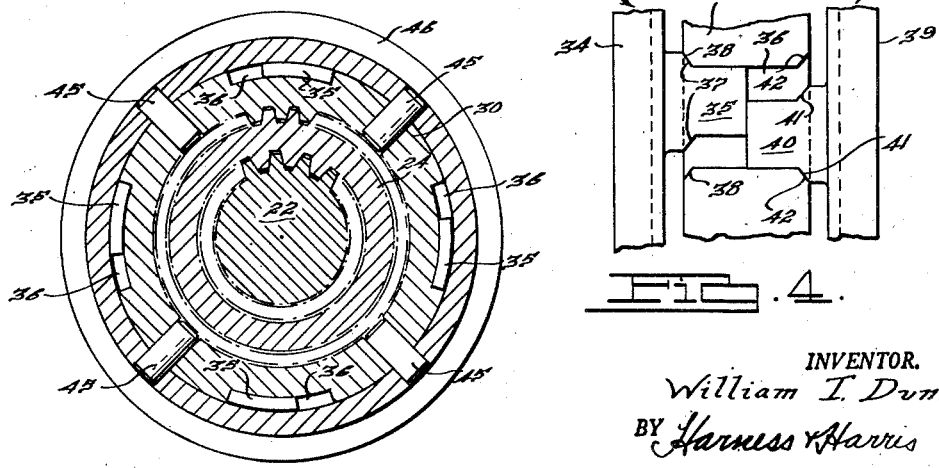
INVENTOR.
William T. Dunn.
BY Harness & Harris
ATTORNEYS

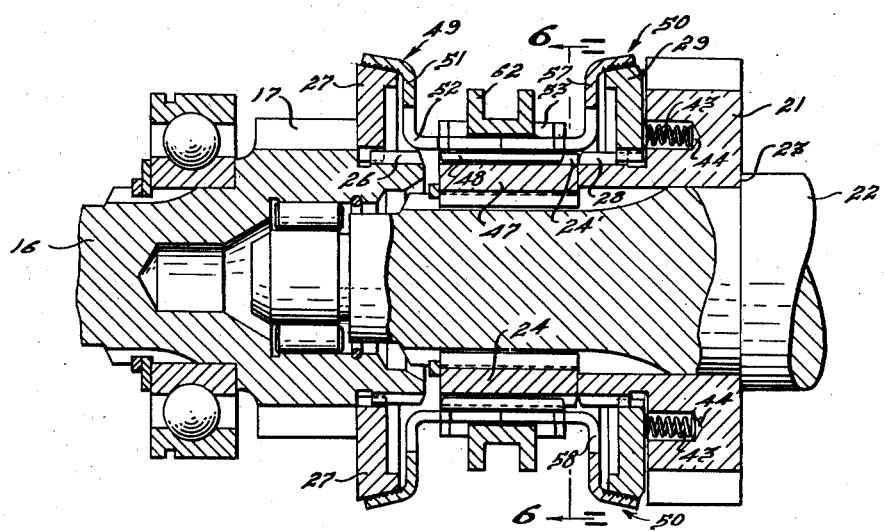

June 5, 1951 W. T. DUNN 2,555,961
TRANSMISSION SYNCHROMESH MECHANISM
Filed Nov. 27, 1946 4 Sheets-Sheet 3
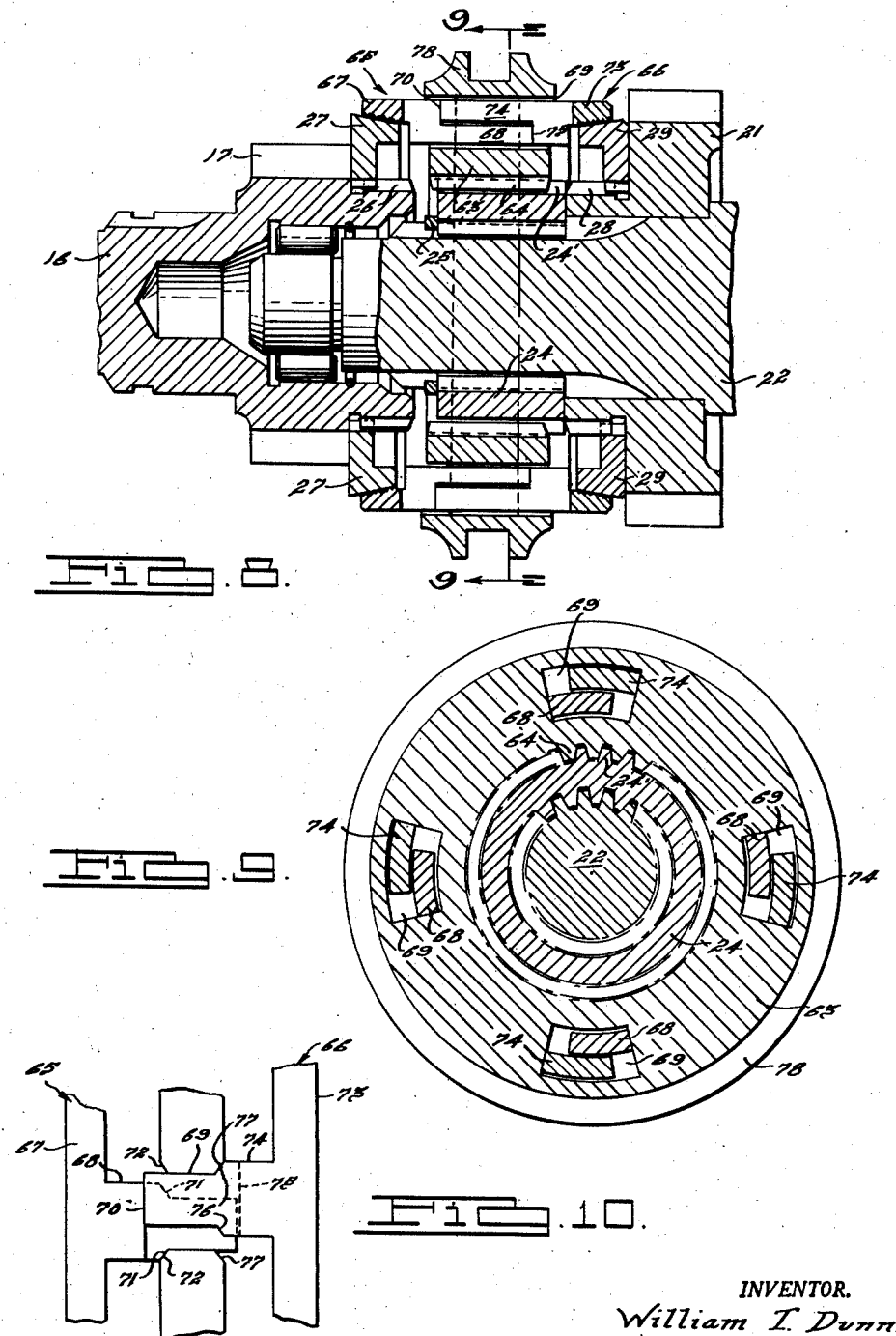
INVENTOR.
William T. Dunn.
BY Harness & Harris
ATTORNEYS.

June 5, 1951  W. T. DUNN  2,555,961
TRANSMISSION SYNCHROMESH MECHANISM
Filed Nov. 27, 1946  4 Sheets-Sheet 4
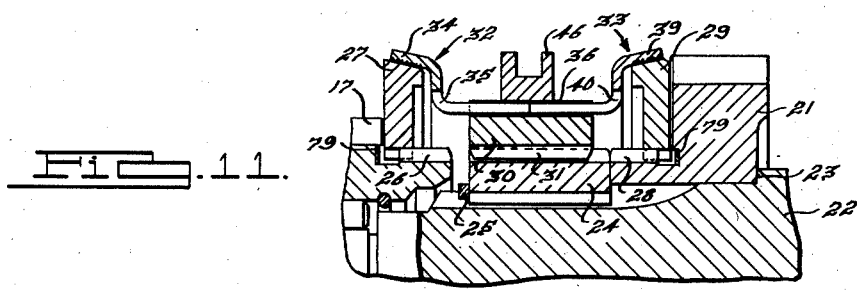
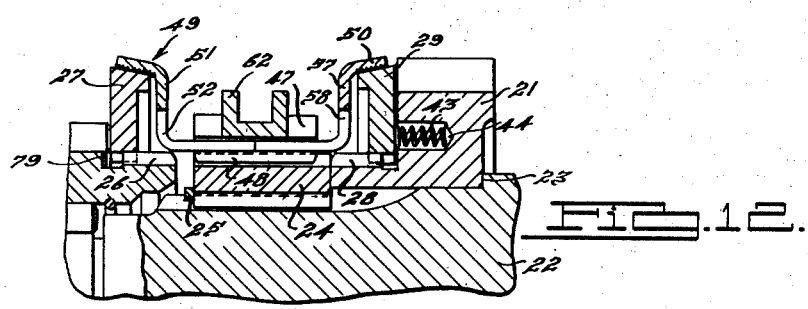
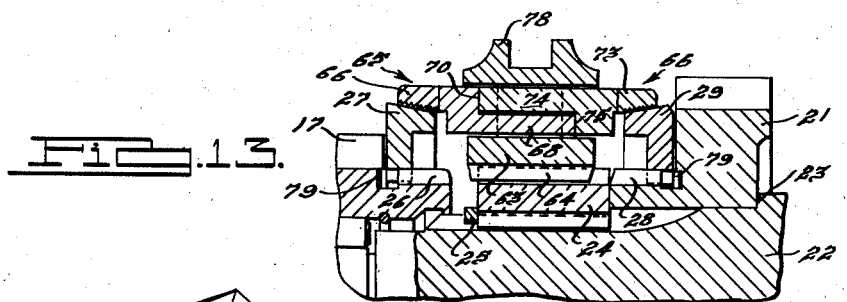
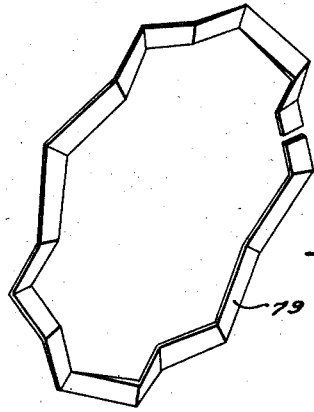
INVENTOR.
William T. Dunn.
BY Harness & Harris
ATTORNEYS.

Patented June 5, 1951

2,555,961

UNITED STATES PATENT OFFICE 2,555,961

TRANSMISSION SYNCHROMESH
MECHANISM

William T. Dunn, Detroit, Mich., assignor to
Chrysler Corporation, Highland Park, Mich., a
corporation of Delaware Application November 27, 1946, Serial No. 712,541

22 Claims. (Cl. 192—53)

This invention relates to an improved power transmitting mechanism of the type adapted for use in a motor vehicle drive system in which positive clutch means is employed to drivingly connect torque transmitting structures.

An object of the invention is to provide simple and efficient means operable to eliminate clashing of the parts to be clutched as an incident to difference in speed of rotation thereof.

The invention has particular application to a vehicle drive system including a plurality of positive clutches and a friction clutch associated with each positive clutch to facilitate operation of the latter.

Another object of the invention is to provision in a synchromesh mechanism of a friction clutch of the blocker type which operates in a minimum of time to control the rotative speeds of the parts to be clutched and which is timely energized to releasably block asynchronous positive clutching; and more particularly to provide an improved arrangement by which the components of a friction clutch for a synchromesh mechanism are relatively positioned for energizing the blocker of such clutch.

Transmission mechanisms of the type used in motor vehicle drives include relatively rotatable torque transmitting structures and a third structure adapted to be selectively, positively clutched therewith to provide relatively different speed ratio drives, and an additional object of the invention is the provision of friction clutches of the blocker type respectively controlling such positive clutching and wherein a component of one such friction clutch cooperates with a component of another clutch to position the components of each friction clutch for continuous frictional engagement sufficient to insure energization of each clutch for timely operation of the blocker thereof.

An additional object of the invention is to provide an improved arrangement for clutch energization wherein provision is made to compensate for initial inaccuracies of manufacture and assembly and subsequent wear, and in this respect the invention provides for the development of an energizing pressure at one friction clutch which is transferred to the other thereof through engaging components of these clutches; or in the alternative the invention contemplates the development of an energizing pressure at each such clutch, with one of these clutches reaching against the other under the influence of this pressure.

A further object is the provision in a synchromesh transmission of a friction clutch or clutches having a relatively large diameter and in which the zone of friction clutching is substantially radially outwardly of the zone of positive clutching, and to provide an arrangement which will facilitate relative movement of the various clutch components to effect operation of each type of clutch.

Other objects and advantages of the invention will be more apparent from the following description taken in connection with the accompanying drawings in which:

Fig. 1 is a fragmentary elevational view of a synchromesh transmission embodying the invention;

Fig. 2 is an enlarged fragmentary sectional elevational view taken as indicated by the line 2—2 of Fig. 1;

Fig. 3 is a transverse section taken on line 3—3 of Fig. 2;

Fig. 4 is an enlarged fragmentary top plan view illustrating the blocking position of components of the synchromesh mechanism;

Fig. 5 is a view similar to Fig. 2 but illustrating a modified form of the invention;

Fig. 6 is a transverse section taken on line 6—6 of Fig. 5;

Fig. 7 is a fragmentary exploded view in perspective showing certain of the components of the clutches prior to final assembly;

Fig. 8 is a view corresponding to Fig. 2 but illustrating a further modification of the invention;

Fig. 9 is a transverse sectional view taken on line 9—9 of Fig. 8;

Fig. 10 is an enlarged fragmentary top plan view illustrating the blocking position of components of the Fig. 9 synchromesh mechanism;

Fig. 11 is a view similar to Fig. 2, but illustrating a further modification of the blocker energizing for each friction clutch;

Fig. 12 is a view similar to Fig. 5, but illustrating a further modification of the blocker energizing for each friction clutch;

Fig. 13 is a view similar to Fig. 8, but illustrating a further modification of the blocker energizing for each friction clutch;

Fig. 14 is a fragmentary perspective view of a blocker energizing spring shown in Figs. 11, 12, and 13.

The invention is illustrated and described in conjunction with a synchromesh mechanism for a motor vehicle transmission presently used although it will be understood that the improvements may be applied to other transmission arrangements, particularly where it is desired to synchronize and drivingly connect rotating structures. The transmission includes a casing 15 into which extends a driving shaft 16 which is adapted to be driven by the engine, preferably through the medium of a releasable clutch, the engine and clutch not being shown herein as either may be of the well known form and arrangement currently used in motor vehicles.

The shaft 16 carries a main driving gear 17 which is in constant mesh with a gear 18 of a countershaft gear cluster mounted for rotation on a countershaft 19. The gear cluster includes a second speed gear 20 in constant mesh with a second speed gear 21 rotatably mounted on the transmission driven shaft 22 adapted to be connected to the ground wheels of the vehicle in the well known manner. Such transmission contemplates provision of the usual reverse drive and also a low speed drive, but the same are omitted here for the sake of brevity inasmuch as the invention is applied herein to the direct and second speed drives. The gear 21 is retained axially stationary between a shoulder 23 on shaft 22 and a hub 24 splined to the latter, abutting gear 21, and retained by a snap ring 25. The hub has external splines 24'. The shaft 16 has a set of clutch teeth 26 to which is splined a friction clutch part 27 having a frusto-conical peripheral surface, and the gear 21 has a set of clutch teeth 28 to which is splined a friction clutch part 29 having a frusto-conical peripheral surface.

Referring particularly to Figs. 1 to 4, inclusive, a clutch sleeve 30 having internal teeth 31 drivingly engaged with the hub splines 24' is positioned between the sets of teeth 26, 28 and is adapted to be axially shifted to selectively clutch therewith, to provide a direct drive between shafts 16, 22 when clutched with teeth 26, and a second speed drive therebetween when clutched with teeth 28. Each such shift is made under control of synchronizing means for insuring uniform rotation of the teeth to be clutched and means for preventing a complete clutching shift of the sleeve until a synchronized relationship of the clutching teeth is established. This control means includes synchronizing friction clutch elements 32 and 33 respectively operably associated with the parts 27 and 29.

The friction element 32 includes an annular portion 34 having a frusto-conical surface engageable with the external surface of part 27 and a plurality of circumferentially spaced generally axially extending fingers, parts as projections 35, preferably integral with portion 34, respectively extending into recesses 36 in the outer periphery of the sleeve 30 to rotatably connect element 32 with the latter. Each such recess 36 has a circumferential dimension greater than the width of the finger to accommodate limited relative rotation between element 32 and sleeve 30. As shown in Fig. 4, each finger 35 is reduced in width to provide opposed cam shoulders 37 respectively engageable with cam shoulders 38 at the entrance to the receiving recess 36 for blocking shift of sleeve 30 to clutch with teeth 26, a shoulder 37 being adapted when so engaged with a shoulder 38 to receive axial thrust from sleeve 30 to force the element 32 into synchronizing frictional driving engagement with part 27 during shift of sleeve 30 to clutch with teeth 26. When such engagement is established relative rotation of element 32 and sleeve 30 will occur permitting the sleeve to complete its clutching shift, the enlarged portion of each finger entering the registering recess 36.

The element 33 is similar to element 32 and has an annular portion 39 provided with a frusto-conical internal surface engageable with the external surface of part 29, and a plurality of circumferentially spaced generally axially extending fingers 40, preferably integral with portion 39. Each finger 40 extends into a recess 36 in sleeve 30 to rotatably connect element 33 with sleeve 30 and each finger has a width less than the circumferential dimension of the recess to permit limited relative rotation between element 33 and sleeve 30. As shown in Fig. 4, each finger 40 is reduced in width to provide opposed cam shoulders 41 respectively engageable with cam shoulders 42 at that end of recess 36 adjacent part 29. The element 33 operates to control shift of sleeve 30 to clutch with teeth 28 in the same general manner as the aforesaid operation of the element 32.

The ends of each registering pair of fingers 35, 40 abut to position the elements 32 and 33 for relatively light frictional engagement with the respective parts 27 and 29, this engagement being of a degree sufficient to cause each element to rotate relative to sleeve 30 to dispose the fingers 35, 40 at one extreme circumferentially of the recess 36 and thereby dispose the shoulders 37, 41 in blocking position as shown in Fig. 4. Thus, when the speed of rotation of each set of teeth 26, 28 varies with respect to the rotative speed of clutch 30, the shoulders 37, 41 are disposed in blocking relation relative to the sleeve 30, and each element is so positioned independently of the other. Tendency of the elements 32, 33 to move in a direction to separate from the cooperating friction part is opposed and limited by engagement of the fingers.

While the initial abutting engagement of fingers 35, 40 may be established on assembly and relied upon to produce the necessary light frictional engagement to energize the blockers as aforesaid, nevertheless it may be expedient for manufacture and assembly to provide for greater tolerances than would exist in the construction so far described and I have, therefore, provided a plurality of coil springs 43 each received in a bore 44 of gear 21 and exerting an axial thrust against friction part 29. The action of such springs will take up clearances resulting from variations in manufacture and will compensate for wear of the components. The axial thrust developed at the friction clutch for the gear 21 will be transmitted to the other friction clutch for the gear 17 through the abutting fingers 35, 40.

If desired the internal surface of each element 32, 33 may be threaded and such element may be made from sheet metal.

The clutch sleeve 30 has secured thereto by pins 45 a shift collar 46 channelled to receive the shifting fork of the well known shifting mechanism.

Referring to Figs. 5, 6, and 7, a clutch sleeve 47 has internal teeth 48 splined to hub teeth 24' and is adapted for opposite axial shift to selectively clutch teeth 48 with teeth 26 to provide a direct drive between shafts 16, 22 or to clutch with teeth 28 to provide a second speed drive between such shafts. Each such shift is made under control of synchronizing means for insuring uniform rotation of the teeth to be clutched and means for preventing a complete clutching shift of the sleeve until a synchronized relationship of the clutching teeth is established. This control means includes synchronizing friction clutch elements 49 and 50, respectively operably associated with the parts 27, 29.

The element 49 has an annular internal frusto-conical surface engageable with the exterior surface of part 27, a radially inwardly extending flange 51, and a plurality of circumferentially spaced axially extending fingers 52 respectively extending into openings 53 in clutch sleeve 47 to provide a lost motion driving connection between element 49 and sleeve 47, each opening and finger having circumferential clearance sufficient to permit limited rotation between element 49 and sleeve 47. A portion of the flange 51 intermediate adjacent fingers 52 is removed as indicated at 54, to provide space to accommodate movement of the sleeve 47 to clutch with teeth 26. Each finger 52 has opposite cam shoulders 55 respectively engageable with cam shoulders 56 at the adjacent entrance opening 53 for blocking shift of sleeve 47 to clutch with teeth 26, a shoulder 55 being adapted when so engaged with a shoulder 56 to receive axial thrust from sleeve 47 to force the element 49 into synchronizing frictional engagement with part 27 during shift of sleeve 47 to clutch with teeth 26. When such engagement is established relative rotation of element 49 and sleeve 47 will occur permitting the sleeve to complete its clutching shift, the enlarged portion of each finger entering the registering opening 53.

The element 50 is similar to element 49 and has an annular internal frusto-conical surface engageable with the external surface of part 29, a radially inwardly extending flange 57, and a plurality of circumferentially spaced fingers 58 respectively projecting into openings 53. A portion of the flange 57 intermediate adjacent fingers 58 is removed as indicated at 59 for providing space to accommodate movement of sleeve 47 to clutch with teeth 28. Each finger has opposite cam shoulders one of which is shown at 60 in Fig. 7, respectively engageable with shoulders 61 at the adjacent entrance of opening 53 for blocking shift of sleeve 47 to clutch with teeth 28 and to receive axial thrust for forcing element 50 into synchronizing frictional driving engagement with part 29. When such engagement is established relative rotation between sleeve 47 and element 50 will occur, such being permitted by the lost motion rotary connection provided by each finger 58 in the opening 53 and the circumferential clearance existing thereat. At final clutching the enlarged portion of each finger 58 will be in the registering recess 53 of the sleeve and the latter will pass through the openings in flange 57 provided by cutting the same away as indicated at 59.

The ends of each registering pair of fingers 52, 58 abut to position the elements 49, 50 for relatively light frictional engagement with the associated parts 27, 29, this engagement being of a degree sufficient to cause each element to rotate relative to sleeve 47 to dispose the fingers 52, 58 at one extreme circumferentially of the opening 53 and thereby dispose one of the shoulders 55, 60 in blocking position, that is, in registration with a sleeve shoulder 56, 61. Thus, when either set of teeth 26, 28 is rotating at a speed different from that of the sleeve 47 either element is free to establish its blocking position independently of the other.

Here, as in the foregoing arrangement, engagement of the registering fingers 52, 58 may be relied upon to position the elements 59, 50 for relatively light frictional engagement with the cooperating parts, although it may be expedient to use springs 43 as pointed out above.

The clutch sleeve 47 is provided with a peripheral channel forming part 62 adapted to receive a shifting fork of any well known shifting mechanism. Referring to Figs. 8, 9, and 10, a sleeve 63 has internal teeth 64 splined to hub teeth 24' and is adapted for opposite axial shift to selectively clutch the teeth thereof with teeth 26 to provide a direct drive between shafts 16, 22, or to clutch with teeth 28 to provide the second speed drive between such shafts. Each such shift is made under control of synchronizing means to insure uniform rotation of the teeth to be clutched and means preventing a complete clutching shift until the synchronized relationship is established. This control means includes synchronizing friction clutch elements 65 and 66, respectively operably associated with parts 27, 29.

The element 65 includes an annular portion 67 having a frusto-conical internal friction surface engageable with the external surface of part 27 and a plurality of circumferentially spaced axially projecting fingers 68 extending into axial openings 69 in sleeve 63. Each finger is reduced in thickness to provide a radially outwardly extending and axially facing abutment 70 and is reduced in width providing opposite cam shoulders 71 respectively engageable with cam shoulders 72 at the adjacent entrance of opening 68 for blocking shift of sleeve 63 to clutch with teeth 26 and to receive axial thrust for forcing element 65 into synchronizing frictional driving engagement with part 27. Each opening 69 is circumferentially larger than the width of the finger portion normally received therein to accommodate limited rotation between sleeve 63 and element 65, and when the aforesaid engagement is established relative movement will release the blocking shoulders 71, 72 to permit completion of the clutching shift of the sleeve.

The element 66 is similar to element 65 and has an annular portion 73 provided with an internal frusto-conical friction surface engageable with the external surface of part 29, and a plurality of circumferentially spaced axially projecting fingers 74 respectively extending into openings 69 of the sleeve 63. Each finger 74 is reduced in thickness to provide a radially inwardly extending axially facing abutment 75 and is reduced in width providing opposite cam shoulders 76 respectively with cam shoulders 77 at the adjacent entrance of opening 69 for blocking shift of sleeve 63 to clutch with teeth 28 and to receive axial thrust for forcing element 66 into synchronizing frictional driving engagement with part 29. Each opening 69 is circumferentially larger than its finger 68 to permit limited relative rotation between sleeves 63 and element 66 and when the aforesaid engagement is established relative movement will release the blocking shoulders 76, 77 to permit completion of the clutching shift.

Each pair of registering fingers 68, 74 overlap in the receiving recess 69 and cooperate one with the other to position the element 65, 66 in relatively light frictional engagement with the respective associated parts 27, 29. For this purpose the free end of each finger 68 engages the shoulder 75 of its registering finger 74 and the free end of each of the latter fingers engages the abutment 70 of the registering finger 68, although for purposes of manufacture and assembly it may be expedient that only one such free end and abutment of a registering pair of fingers engage and this engagement will be sufficient to position the elements for relatively light frictional engagement with its cooperating part. It will be understood that the latter engagement is of a degree sufficient to cause an element 65, 66 to rotate with its cooperating part 27, 29 to one extreme relative to recesses 69, when the speed of rotation of sleeve 63 differs from that of either teeth 26 or 28, and thereby dispose a cam shoulder 71 in blocking relation to a shoulder 72 and a cam shoulder 76 in blocking relation to a shoulder 77.

The sleeve 63 is provided with a channel 78 to receive a yoke of the well known mechanism for shifting the sleeve axially as aforesaid.

Referring to Fig. 11, the construction and operation of the mechanism is substantially similar to that of Fig. 2, except that each friction part 27, 29 is biased in a direction axially to maintain continuous light frictional engagement of each friction clutch to energize the blocking means as aforesaid. For this purpose two springs 79 are employed, one between the gear 21 and part 29 and the other between the gear 17 and part 27, and as typified in Fig. 14 such spring 79 is shown as an undulated washer-like spring although other forms of spring are contemplated in the broad aspect of the invention.

Fig. 12 is a showing similar to Fig. 5, but including a spring 79 specifically biasing the part 27 in a direction to maintain relatively light frictional engagement with the element 49 to energize the blocking means of the latter.

In Fig. 13 the construction and operation of the mechanism is similar to that of Fig. 8, but springs 79 are employed to bias the parts 27, 29 in a direction to maintain relatively light frictional engagement of the parts of each friction clutch.

I claim:

1. In a synchromesh transmission, a plurality of torque transmitting structures each including a set of clutch teeth and a friction clutch part, a clutch member between said sets of teeth and axially shiftable from a neutral position to selectively clutch therewith, relatively axially movable friction clutch elements respectively associated with said parts each including a friction surface and a plurality of fingers interengaged with said clutch member to form a rotary lost motion driving connection therewith and having blocker means adapted for movement between a position to allow a selected clutching shift of said member and a position to block the same by engagement of such friction surface with its associated part, the fingers of each element abutting the other element when the clutch member is in its neutral position to position such other element for continuous engagement of its friction surface with the associated part, at least one of said friction clutch parts being disposed for axial movement relative to its said structure, and spring means acting on said one friction clutch part constantly biasing the same in an axial direction into continuous frictional engagement with the friction surface of the associated element.

2. In a power transmitting mechanism including axially spaced coaxial torque transmitting members each having a set of clutch teeth and a friction clutch part rotatable therewith, a clutch member coaxial with said members and selectively shiftable to clutch with the clutch teeth thereof, friction clutch elements rotatable with said third clutch member respectively cooperating with said parts to form friction clutches, said elements being constructed and arranged for relative axial opposite movements in response to selective clutching shift of said clutch member to relatively move said elements axially and thrust one thereof into synchronizing engagement with its cooperating friction part and said elements being movable one toward the other to release said synchronizing engagement, the zone of frictional engagement of each friction clutch being disposed radially outwardly beyond said sets of clutch teeth and said clutch member having a plurality of circumferentially spaced recesses radially intermediate said zones and said sets of clutch teeth, each of said movable elements having an annular part carrying the friction surface thereof and a plurality of circumferentially spaced parts respectively extending into said recesses, those parts in each recess being arranged in axial overlapping relationship and the overlaping part of one of each of said elements being engageable with the other of said elements to limit movement of said elements one toward the other.

3. In a power transmitting mechanism including axially spaced coaxial torque transmitting members each having a set of clutch teeth and a friction clutch part rotatable therewith, a clutch member coaxial with said members and selectively shiftable to clutch with the clutch teeth thereof, friction clutch elements rotatable with said third clutch member respectively cooperating with said parts to form friction clutches, said elements being constructed and arranged for relative axial opposite movement in response to selective clutching shift of said clutch member to relatively move said elements axially and thrust one thereof into synchronizing engagement with its cooperating friction part and said elements being movable one toward the other to release said synchronizing engagement, the zone of frictional engagement of each friction clutch being disposed radially outwardly beyond said sets of clutch teeth and said clutch member having a plurality of circumferentially spaced recesses radially intermediate said zones and said sets of clutch teeth, each of said movable elements having an annular part carrying the friction surface thereof and a plurality of circumferentially spaced parts respectively extending into said recesses, those parts in each recess being arranged in axial overlapping relationship and the overlapping part of one of each of said elements being engageable with the other of said elements to limit movement of said elements one toward the other, and spring means acting on at least one of the first mentioned friction parts to bias the same into continuous frictional engagement with its said cooperating friction clutch element.

4. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, said clutch member having a plurality of circumferentially spaced openings therein and cam means adjacent each opening, relatively rotatable friction clutch devices each including a ring-like body axially spaced from the body of the other device and cooperating with an aforesaid friction clutch part to form a friction clutch, means maintaining the cooperating parts of each such friction clutch in continuous relatively light frictional rotative engagement prior to selected shift of said clutch member from its neutral position, said means including a plurality of relatively circumferentially spaced projections carried by each of said devices and respectively circumferentially registering with the projections of the other device, the said registering projections extending into a common opening in said clutch member and disposed therein in rotative abutting relationship one with the other when said clutch member is in its neutral position, the projections of each device having clearance in the respective clutch member openings sufficient to accommodate limited oscillatory movement of such device and its projections relative to said clutch member, and cam means carried by the projections of each device cooperable with cam means of said clutch member when such device and projections are at either limit of the aforesaid oscillatory movement to form a releasable thrust transmitting connection therebetween for thrust of a ring-like body into synchronizing engagement with its cooperating friction clutch part in response to a selected clutching shift of said clutch member.

5. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, said clutch member having a plurality of circumferentially spaced openings therein and cam means adjacent each opening, relatively rotatable friction clutch devices each including a ring-like body axially spaced from the body of the other device and cooperating with an aforesaid friction clutch part to form a friction clutch, means maintaining the cooperating parts of each such friction clutch in continuous relatively light frictional engagement prior to selected shift of said clutch member from its neutral position, said means including a plurality of relatively circumferentially spaced projections carried by each of said devices and respectively circumferentially registering with the projections of the other device, the said registering projections extending into a common opening in said clutch member and disposed therein in radially overlapping rotative abutting relationship one with the other when said clutch member is in its neutral position, the projections of each device having clearance in the respective clutch member openings sufficient to accommodate limited oscillatory movement of such device and its projections relative to said clutch member, and cam means carried by the projections of each device cooperable with cam means of said clutch member when such device and projections are at either limit of the aforesaid oscillatory movement to form a releasable thrust transmitting connection therebetween for thrust of a ring-like body into synchronizing engagement with its cooperating friction clutch part in response to a selected clutching shift of said clutch member.

6. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, said clutch member having a plurality of circumferentially spaced openings therein and cam means adjacent each opening, relatively rotatable friction clutch devices each including a ring-like body axially spaced from the body of the other device and cooperating with an aforesaid friction clutch part to form a friction clutch, means maintaining the cooperating parts of each such friction clutch in continuous relatively light frictional engagement prior to selected shift of said clutch member from its neutral position, said means including a plurality of relatively circumferentially spaced projections carried by each of said devices and respectively circumferentially registering with the projections of the other device, the said registering projections extending into a common opening in said clutch member and disposed therein in rotative abutting relationship one with the other when said clutch member is in its neutral position, at least one of the first mentioned friction clutch parts being disposed for axial movement relative to its torque transmitting structure and said means further including a spring acting between said one friction clutch part and its said torque transmitting structure biasing said one friction clutch part axially toward its cooperating ring-like body, the projections of each device having clearance in the respective clutch member openings sufficient to accommodate limited oscillatory movement of such device and its projections relative to said clutch member, and cam means carried by the projections of each device cooperable with cam means of said clutch member when such device and projections are at either limit of the aforesaid oscillatory movement to form a releasable thrust transmitting connection therebetween for thrust of a ring-like body into synchronizing engagement with its cooperating friction clutch part in response to a selected clutching shift of said clutch member.

7. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, said clutch member having a plurality of circumferentially spaced openings therein and cam means adjacent each opening, relatively rotatable friction clutch devices each including a ring-like body axially spaced from the body of the other device and cooperating with an aforesaid friction clutch part to form a friction clutch, means maintaining the cooperating parts of each such friction clutch in continuous relatively light frictional engagement prior to selected shift of said clutch member from its neutral position, said means including a plurality of relatively circumferentially spaced projections carried by each of said devices and respectively circumferentially registering with the projections of the other device, the said registering projections extending into a common opening in said clutch member and disposed therein in rotative abutting relationship one with the other when said clutch member is in its neutral position, at least one of the first mentioned friction clutch parts being disposed for axial movement relative to its torque transmitting structure and said means further including a spring acting between said one friction clutch part and its said torque transmitting structure biasing said one friction clutch part axially toward its cooperating ring-like body, said projections constituting means operating when said clutch member is in its neutral position to transmit the aforesaid axial spring biasing to the ring-like body of the other friction clutch to thereby impart a thrust to the latter in an axial direction to engage its cooperating friction clutch part, the projections of each device having clearance in the respective clutch member openings sufficient to accommodate limited oscillatory movement of such device and its projections relative to said clutch member, and cam means carried by the projections of each device cooperable with cam means of said clutch member when such device and projections are at either limit of the aforesaid oscillatory movement to form a releasable thrust transmitting connection therebetween for thrust of a ring-like body into synchronizing engagement with its cooperating friction clutch part in response to a selected clutching shift of said clutch member.

8. A power transmitting mechanism comprising a combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, said clutch member having a plurality of circumferentially spaced openings therein and cam means adjacent each opening, relatively rotatable friction clutch devices each including a ring-like body axially spaced from the body of the other device and cooperating with an aforesaid friction clutch part to form a friction clutch, means maintaining the cooperating parts of each such friction clutch in continuous relatively light frictional engagement prior to selected shift of said clutch member from its neutral position, said means including a plurality of relatively circumferentially spaced projections carried by each of said devices and respectively circumferentially registering with the projections of the other device, the said registering projections extending into a common opening in said clutch member and disposed therein in rotative abutting relationship one with the other when said clutch member is in its neutral position, each of said first mentioned clutch parts being disposed for axial movement relative to its said torque transmitting structure in a direction one toward the other and toward its cooperating ring-like body, said means further including a spring acting between each friction clutch part and its torque transmitting structure biasing such part in its said direction, and said projections when in said abutting relationship maintaining a minimum axial spacing of said ring-like bodies in opposition to the biasing action of said springs, the projections of each device having clearance in the respective clutch member openings sufficient to accommodate limited oscillatory movement of such device and its projections relative to said clutch member, and cam means carried by the projections of each device cooperable with cam means of said clutch member when such device and projections are at either limit of the aforesaid oscillatory movement to form a releasable thrust transmitting connection therebetween for thrust of a ring-like body into synchronizing engagement with its cooperating friction clutch part in response to a selected clutching shift of said clutch member.

9. In a power transmitting mechanism, in combination, axially spaced torque transmitting driving members, a set of clutch teeth rotatably driven with each of said members, a torque transmitting structure adapted to be selectively driven from said members including a positive clutch member axially oppositely shiftable to selectively clutch with the teeth of said sets to provide said selective drive connections, a friction clutch respectively controlling clutching of said clutch member with said sets of clutch teeth including axially spaced first friction clutch elements respectively rotatably driven with said members and second friction clutch elements respectively associated with the first elements and rotatably driven with said third structure for limited oscillatory movement relative thereto and relative to each other, the second element of each friction clutch being adapted for movement to its aforesaid limit by relatively light frictional engagement with its associated first element and each second element when at such limit having means cooperable with the positive clutch member to releasably block a selected clutching shift thereof, a spring acting between each torque transmitting member and the first friction clutch element rotatable therewith continuously biasing the last element into relatively light frictional engagement with its associated second friction clutch element, said second friction clutch elements reacting one against the other in opposition to the biasing of said springs.

10. In a power transmitting mechanism, in combination, axially spaced torque transmitting driving members, a set of clutch teeth rotatably driven with each of said members, a torque transmitting structure adapted to be selectively driven from said members including a positive clutch member axially oppositely shiftable to selectively clutch with the teeth of said sets to provide said selective drive connections, a friction clutch respectively controlling clutching of said clutch member with said sets of clutch teeth including axially spaced first friction clutch elements respectively rotatably driven with said members and second friction clutch elements respectively associated with the first elements and rotatably driven with said third structure for limited oscillatory movement relative thereto and relative to each other, the second element of each friction clutch being adapted for movement to its aforesaid limit by relatively light frictional engagement with its associated first element and each second element when at such limit having means cooperable with the positive clutch member to releasably block a selected clutching shift thereof, a spring acting between each torque transmitting member and the first friction clutch element rotatable therewith continuously biasing the last element into relatively light frictional engagement with its associated second friction clutch element, said second friction clutch elements reacting one against the other in opposition to the biasing of said springs, at least one of said torque transmitting members and the first friction clutch element having adjacent faces, said one member having a recess communicating with its said face and the biasing spring extending into said recess and engaging the said face of the last mentioned first friction clutch element.

11. In a power transmitting mechanism, in combination, axially spaced torque transmitting driving members, a set of clutch teeth rotatably driven with each of said members, a torque transmitting structure adapted to be selectively driven from said members including a positive clutch member axially oppositely shiftable to selectively clutch with the teeth of said sets to provide said selective drive connections, a friction clutch respectively controlling clutching of said clutch member with said sets of clutch teeth including axially spaced first friction clutch elements respectively rotatably driven with said members and second friction clutch elements respectively associated with the first elements and rotatably driven with said third structure for limited oscillatory movement relative thereto and relative to each other, a second element of at least one of the friction clutches being mounted for axial movement relative to the torque transmitting member with which it is rotatably driven, and means maintaining the elements of each friction clutch in relatively light frictional engagement prior to a selected shift of said positive clutch member including spring means continuously biasing the second element of said one friction clutch axially into engagement with its associated first element, said second elements being disposed in rotative abutting relationship when said clutch member is in its neutral position to limit movement of such elements one toward the other and to maintain the second element of the other friction clutch in relatively light frictional engagement with its associated first element under the influence of the biasing of said spring means.

12. In a power transmitting mechanism, in combination, axially spaced torque transmitting driving members, a set of clutch teeth rotatably driven with each of said members, a torque transmitting structure adapted to be selectively driven from said members including a positive clutch member axially oppositely shiftable to selectively clutch with the teeth of said sets to provide said selective drive connections, a friction clutch respectively controlling clutching of said clutch member with said sets of clutch teeth including axially spaced first friction clutch elements respectively rotatably driven with said members and second friction clutch elements respectively associated with the first elements and rotatably driven with said third structure for limited oscillatory movement relative thereto and relative to each other, a second element of at least one of the friction clutches being mounted for axial movement relative to the torque transmitting member with which it is rotatably driven, and means maintaining the elements of each friction clutch in relatively light frictional engagement prior to a selected shift of said positive clutch member including spring means continuously biasing the second element of said one friction clutch axially into engagement with its associated first element, said second elements being disposed in rotative abutting relationship when said clutch member is in its neutral position to limit movement of such elements one toward the other and to maintain the second element of the other friction clutch in relatively light frictional engagement with its associated first element under the influence of the biasing of said spring means, the last mentioned torque transmitting member and the said second friction clutch element rotatably driven therewith having adjacent faces and such member having a recess therein communicating with its said face, said spring biasing means including a spring extending into said recess and engaging the said face of said second friction clutch element.

13. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices respectively associated with said friction clutch parts to form friction clutches, each device including a body, spaced axially from the body of the other device, having a friction clutching surface and adapted for thrust movement in an axial direction away from the other body to effect relatively heavy, frictional synchronizing engagement of the clutching surface thereof with its associated friction clutch part, a projection carried by each body having a lost motion connection with respect to said third structure accommodating limited oscillatory movement of such projection and its body relative to said third structure and said clutch member in response to relatively light frictional engagement of such body with its associated friction clutch part, said clutch member and each device having means cooperable to form a thrust transmitting connection therebetween when the projection and body of such device are at a limit of the aforesaid oscillatory movement to thereby thrust the body of such device in its said axial direction of movement in response to a selected shift of said clutch member, the friction clutch part of one of said friction clutches being mounted for axial movement, and spring means continuously biasing said one friction clutch part axially toward its associated friction clutch device body, the projection of each device rotatively engaging the other device when said clutch member is in its neutral position to limit movement of said bodies one toward the other and to position the friction clutch device body of said one friction clutch in continuous relatively light frictional engagement with its spring biased friction clutch parts prior to shift of said clutch member from its neutral position, said projections when so engaged operating to transmit the biasing of said spring means to the friction clutch device body of the other friction clutch and through the transmission of such biasing and said limiting movement maintaining the last mentioned body in continuous relatively light frictional engagement with its associated friction clutch part prior to shift of said sleeve from its neutral position.

14. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices respectively associated with said friction clutch parts to form friction clutches, each device including a body, spaced axially from the body of the other device, having a friction clutching surface and adapted for thrust movement in an axial direction away from the other body to effect relatively heavy, frictional synchronizing engagement of the clutching surface thereof with its associated friction clutch part, a projection carried by each body having a lost motion connection with respect to said third structure accommodating limited oscillatory movement of such projection and its body relative to said third structure and said clutch member in response to relatively light frictional engagement of such body with its associated friction clutch part, said clutch member and each device having means cooperable to form a thrust transmitting connection therebetween when the projection and body of such device are at a limit of the aforesaid oscillatory movement to thereby thrust the body of such device in its said axial direction of movement in response to a selected shift of said clutch member, the projection of each device rotatively engaging the other device when said clutch member is in its neutral position to limit axial movement of said friction clutch device bodies in a direction one toward the other, each of said friction clutch parts being mounted for axial movement, and spring means continuously biasing each of said friction clutch parts axially toward the body of its associated friction clutch device and cooperating with the aforesaid limiting movement effected by said projections to provide said continuous relatively light frictional engagement of the components of each friction clutch.

15. In a power transmitting mechanism in combination, first and second torque transmitting members, a set of positive clutching teeth rotatably driven with each member, a friction clutch part associated with each member and including a ring-like body having a friction clutching surface at its radially outer periphery and teeth at its radially inner periphery engaged with the positive clutch teeth of the associated member for rotation therewith and for axial movement relative thereto, a torque transmitting structure adapted to be selectively drivingly connected with said first and second members and coaxial therewith including an axially stationary rotatable member and a clutch member rotatably driven with the latter and axially oppositely shiftable from a neutral position to selectively clutch with said sets of clutch teeth to provide said drives, friction clutch devices respectively associated with said friction clutch parts to provide friction clutches, each device including a friction surface carrying body axially spaced from the body of the other device and said bodies being adapted for relative axial opposite thrust movement for synchronizing engagement with their respective components, means maintaining the components of each friction clutch in continuous relatively light frictional engagement prior to shift of said clutch member from its neutral position comprising relatively circumferentially spaced projections carried by each device engaging the other device when said clutch member is in its neutral position maintaining a predetermined minimum axial spacing of the bodies of said devices, and spring means continuously biasing one of said friction clutch parts axially toward the friction surface carrying body of the associated device, one of the members of said torque transmitting structure having circumferentially spaced openings and each projection having a first portion reduced in dimension relative to an adjacent portion in a direction generally transverse to the longitudinal axis of such projection and extending into an opening of said one member with clearance therein accommodating limited oscillatory movement of such projections and the device thereof relative to the projections of the other device and relative to the said members of said torque transmitting structure under the influence of the aforesaid continuous relatively light frictional engagement, the projections of each device having a shoulder at the juncture of its aforesaid portions thereof disposed in thrust receiving relationship with said clutch member when such projections are at a limit of oscillatory movement for thrusting the body of such device into synchronizing engagement with its cooperating clutch part in response to a selected clutching shift of said clutch member.

16. In a power transmitting mechanism in combination, relatively rotatable first and second torque transmitting structures, a set of clutch teeth and a component of a friction clutch rotatably driven with each of said structures, a third torque transmitting structure adapted to be selectively drivingly connected with said first and second structures and including an axially stationary rotary member and a clutch member rotatably connected therewith axially oppositely shiftable from a neutral position thereof to selectively clutch with the teeth of said sets to provide said selective drive connections, friction clutch devices respectively associated with said components to provide friction clutches respectively controlling the clutching shifts of said clutch member, each device inluding an annular body carrying a friction clutching surface adapted for thrust movement into synchronizing engagement with its cooperating component, means maintaining the friction clutching surface of each of said devices in continuous relatively light frictional engagement with its associated component prior to selected clutching shift of said clutch member including a projection extending from the body of each device toward and circumferentially registering with the projection of the other device, one of the members of said third torque transmitting structure having an opening therein and said registering projections extending into said opening with clearance therein accommodating limited oscillation of each projection relative to said one member under the influence of said relatively light frictional engagement when said third structure is rotating asynchronously relative to said first and second structures respectively, each projection having a shoulder intermediate its length and having a portion overlapping the portion of the other projection and disposed in endwise rotative abutting relationship with the shoulder of such other projection when said clutch member is in its neutral position, said clutch member and the projection of each device having cam means cooperable to form a releasable thrust transmitting connection therebetween when such projection is at a limit of its oscillatory movement operable to thrust the friction clutching surface of such device into synchronizing engagement with its cooperating component in response to a selected clutching shift of said member.

17. In a power transmitting mechanism including axially spaced coaxial torque transmitting members each having a set of clutch teeth and a friction clutch part rotatable therewith, a torque transmitting structure adapted to be selectively drivingly connected with said members including a clutch member coaxial with said members and axially oppositely shiftable from a neutral position to selectively clutch with the clutch teeth thereof, friction clutch elements each having a rotatable driven connection with said clutch member respectively cooperating with said parts to form friction clutches, said elements being adapted for relative axially opposite movement one away from the other and each having means cooperable with said clutch member to form a thrust transmitting connection therebetween for moving such element as aforesaid into synchronizing engagement with its cooperating friction part in response to a selected shift of said clutch members and said elements being movable one toward the other one of said torque transmitting members having an opening therein, and a spring extending into said opening biasing the said friction clutch part rotatable with said one member into engagement with its said cooperating friction clutch element to release said synchronizing engagement, said clutch member having an opening therein and each of said movable elements having a part thereof extending into said opening to form said rotatable drive connection and rotatively engaging the other element prior to shift of said clutch member from its neutral position to limit the last mentioned movement of said movable elements.

18. In a power transmitting mechanism including axially spaced coaxial torque transmitting driving members each having a set of clutch teeth and a friction clutch part rotatable therewith, a clutch member coaxial with said members and axially oppositely shiftable from a neutral position thereof to selectively clutch with said sets of clutch teeth, friction clutch elements rotatable with said third clutch member respectively cooperating with said parts to form friction clutches, said elements being constructed and arranged for relative axial opposite thrust movement and each thereof having means co-operable with said clutch member to form a releasable thrust transmitting connection therebetween for thrust movement of such element into synchronizing engagement with its cooperating friction clutch element in response to a selected shift of said clutch member, the zone of frictional engagement of each friction clutch being disposed radially outwardly beyond said sets of clutch teeth and said clutch member having a plurality of circumferentially spaced recesses radially intermediate said zone and said sets of clutch teeth, each of said movable elements having an annular part carrying the friction surface thereof and a flange extending generally radially inwardly therefrom toward a set of said clutch teeth and beyond the radial outer periphery of said clutch member, a plurality of relatively circumferentially spaced fingers carried by said flange respectively extending into the recesses of said clutch member and said flange having openings therein circumferentially alternating with the fingers thereof respectively adapted to receive those portions of said clutch member circumferentially between the recesses thereof when said clutch member is clutched with the last mentioned set of clutch teeth, the fingers of one of said elements engaging the other element when said clutch member is in its neutral position to maintain said annular parts in a predetermined minimum axially spaced relationship, spring means continuously biasing the friction clutch part of one of said friction clutches into engagement with its associated friction clutch element and the fingers of said friction clutch elements when engaged as aforesaid operating to transmit the biasing of said spring means to the friction clutch element of the other friction clutch thereby biasing the last mentioned element into engagement with its associated friction clutch part.

19. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices respectively engageable with said friction clutch parts, and means positioning each device in rotatable frictional driving engagement with its associated frictional clutch part prior to selected shift of said clutch member from its neutral position comprising axially extending projections respectively carried by said devices for rotation therewith and against circumferential and axial movements relative thereto, the projection carried by each device having a lost-motion rotary connection relative to said clutch member accommodating limited rotation of such projection and its device relative to said clutch member in response to frictional driving engagement of such device with its associated friction clutch part and rotatively axially abutting the other device when said clutch member is in its neutral position, and blocker means carried by each projection disposed in position to releasably block a selected clutching shift of said clutch member when such projection is at a limit of its aforesaid rotary movement.

20. A power transmitting mechanism comprising in combination first and second relatively rotatable torque transmitting structures, a set of clutch teeth and a friction clutch part disposed for rotation with each of said structures, a third torque transmitting structure coaxial with said first and second structures and adapted to be selectively drivingly connected therewith, a clutch member rotatably driven with said third structure and adapted to be shifted from a neutral position thereof selectively in opposite axial directions for selective clutching engagement with said sets of clutch teeth thereby to provide said selective drive connections, relatively rotatable friction clutch devices respectively engageable with said friction clutch parts, and means positioning each device in rotatable frictional driving engagement with its associated frictional clutch part prior to selected shift of said clutch member from its neutral position comprising axially extending projections respectively carried by said devices for rotation therewith and against circumferential and axial movements relative thereto, the projection carried by each device having a lost-motion rotary connection relative to said clutch member accommodating limited rotation of such projection and its device relative to said clutch member in response to frictional driving engagement of such device with its associated friction clutch part and rotatively axially abutting the other device when said clutch member is in its neutral position, and blocker means carried by each projection disposed in position to releasably block a selected clutching shift of said clutch member when such projection is at a limit of its aforesaid rotary movement, said positioning means further including spring means biasing one of said friction clutch elements into frictional engagement with its associated device.

21. In a synchromesh mechanism, a plurality of torque transmitting structures each including a set of clutch teeth and a friction clutch part, said parts being axially spaced and one thereof being disposed for movement relative to its said structure, a clutch member between said sets of clutch teeth and oppositely axially shiftable to selectively clutch therewith, friction clutch elements respectively associated with said friction clutch parts, each element including blocker means movable between a position to allow a selected clutching shift of said member and a position to releasably block the same in response to frictional driving engagement between such element and its associated clutch part, and means maintaining each associated element and part in said frictional driving engagement prior to selected clutching shift of said member from its neutral position comprising a generally axially extending projection supported at one end thereof by one of said friction clutch elements for rotation therewith and rotatively abutting the other of said friction clutch elements when the clutch member is in its said neutral position and limiting movement of said elements one toward the other, said means further including spring means biasing said one friction clutch part into frictional engagement with its associated friction clutch part.

22. In a power transmitting mechanism, first and second rotatable torque transmitting structures each having a set of clutch teeth and a friction clutch element disposed for rotation therewith, a third rotatable torque transmitting structure coaxial with and adapted to be selectively drivingly connected with said first and second structures, a clutch member rotatably driven with said third structure and adapted to be shifted from a neutral position thereof for selective clutching engagement with said sets of clutch teeth thereby to provide said selective drive connections, said member having a plurality of circumferentially spaced openings therein, relatively rotatable friction clutch devices respectively associated with said friction clutch elements and having a body part provided with a friction surface engageable with the associated friction clutch element and spaced axially from the body part of the other device, each device including a part circumferentially and axially rigid with the body part thereof and projecting axially therefrom into an opening in said clutch member with circumferential clearance therein, the projecting part of each device having blocker means adapted to be disposed in position to releasably block a selected clutching shift of said clutch member in response to frictional driving engagement of the clutching surface of such device with the associated friction clutch element, the projecting part of each device rotatively axially abutting the other device to position the friction clutching surface of each device in continuous frictional driving engagement with its associated friction clutch element to thereby dispose the blocking means of each device in the said blocking position prior to selected shift of said clutch member from its neutral position.

WILLIAM T. DUNN.

REFERENCES CITED

The following references are of record in the file of this patent:

UNITED STATES PATENTS

| Number | Name | Date |
| --- | --- | --- |
| 1,786,980 | Carling | Dec. 30, 1930 |
| 1,886,850 | Tenney | Nov. 8, 1932 |
| 1,931,288 | Griswold | Oct. 17, 1933 |
| 1,987,682 | Hunt | Jan. 15, 1935 |
| 2,157,249 | Tenney et al. | May 9, 1939 |
| 2,221,899 | White et al. | Nov. 19, 1940 |
| 2,251,342 | Rauen | Aug. 5, 1941 |
| 2,271,571 | Peterson | Feb. 3, 1942 |
| 2,369,842 | Neracher et al. | Feb. 20, 1945 |
| 2,397,344 | Fishburn | Mar. 26, 1946 |